(12) United States Patent
Wolski (10) Patent No.: US 9,120,427 B1
(45) Date of Patent: Sep. 1, 2015

(54) SWIVELING TAILGATE SUPPORT SYSTEM

(71) Applicant: Bruce E. Wolski, Longmont, CO (US)

(72) Inventor: Bruce E. Wolski, Longmont, CO (US)

( * ) Notice: Subject to any disclaimer, the term of this patent is extended or adjusted under 35 U.S.C. 154(b) by 226 days.

(21) Appl. No.: 13/937,380

(22) Filed: Jul. 9, 2013

(51) Int. Cl.
*B60R 5/04* (2006.01)

(52) U.S. Cl.
CPC ........................................ *B60R 5/04* (2013.01)

(58) Field of Classification Search
CPC ............ B60R 5/04; B60R 9/06; B60R 11/06; B60R 2011/0082; B60R 2011/0084; B60R 2011/0087
USPC .............. 296/57.1, 60, 50, 51, 37.6; 224/403, 224/404
See application file for complete search history.

(56) References Cited

U.S. PATENT DOCUMENTS

| | | | | |
|---|---|---|---|---|
| 4,266,821 A * | 5/1981 | Gillet | | 296/37.6 |
| 4,564,167 A * | 1/1986 | Smith | | 248/552 |
| 4,811,875 A * | 3/1989 | DiSimone | | 224/541 |
| 4,819,900 A * | 4/1989 | Funk | | 248/244 |
| 4,971,234 A * | 11/1990 | Hay | | 224/42.32 |
| D349,680 S | 8/1994 | Powell | | |
| 5,338,016 A * | 8/1994 | Howard | | 269/97 |
| 5,498,049 A | 3/1996 | Schlachter | | |
| 5,964,492 A | 10/1999 | Lyon | | |
| 6,170,724 B1 | 1/2001 | Carter et al. | | |
| 7,073,867 B2 * | 7/2006 | Huenke | | 298/1 A |
| 7,309,093 B2 * | 12/2007 | Ward | | 296/37.6 |
| 8,210,365 B2 * | 7/2012 | Van Wyk | | 211/85.7 |
| 8,281,967 B2 * | 10/2012 | Evans | | 224/404 |
| 2003/0189353 A1 * | 10/2003 | Moore | | 296/37.6 |
| 2006/0175493 A1 * | 8/2006 | Norman | | 248/235 |

* cited by examiner

*Primary Examiner* — Jason S Morrow
*Assistant Examiner* — E Turner Hicks
(74) *Attorney, Agent, or Firm* — Kyle A. Fletcher, Esq.

(57) ABSTRACT

The swiveling tailgate support system includes an outer support assembly that is affixed to an inner surface of a tailgate. An inner support assembly connects to and rotates with respect to the outer support assembly such that as the tailgate is raised or lowered, the inner support assembly rocks at a level orientation. The outer support assembly includes an in outer support plate on distal ends, which receive inner support plates located at distal ends of the inner support assembly. The outer support plate is able to rotate from a prone position to an erected position. The outer support plates each include a lock pin that extends outwardly with respect to the vehicle, and which enables a pivot bracket of the inner support plate to engage, lock, hang, and pivot there from.

15 Claims, 13 Drawing Sheets

SWIVELING TAILGATE SUPPORT SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of tailgate accessories, more specifically, an accessory for a tailgate that is able to swivel as the tailgate rotates down or up.

SUMMARY OF THE INVENTION

An embodiment of the disclosure comprises an outer support assembly that is adapted to be affixed to an inner surface of a tailgate, and further includes an in outer support plate on distal ends. The outer support plate is able to rotate from a prone position to an erected position, and when in said erected position enables an inner support assembly to connect thereon. The inner support assembly is able to pivot with respect to the outer support plate via inner support plates provided on distal ends. The outer support plates each include a lock pin that extends outwardly with respect to the vehicle. The lock pin hang there from such that the inner support plate is able to pivot with respect to the outer support plate. As the tailgate is raised or lowered the inner support assembly rocks with respect to the tailgate and the outer support assembly. The inner support assembly is further defined with inner support members that span in between the inner support plates. The inner support members are configured to support at least one object thereon such that the object is easily accessibly and adjacent to the inner surface of the tailgate, and is also able to self-level itself as the tailgate is raised or lowered.

An object of the invention is to provide a swiveling tailgate support assembly that attaches to an inner surface of a tailgate, and is able to store objects at a level orientation despite the raising or lowering of the tailgate.

A further object of the invention is for the outer support assembly to include outer support plates that are able to fold flat with the inner surface of the tailgate, and when in said prone state shall limit the encumbrance of the invention when not in use and with respect to the tailgate.

Another object of the invention is for the outer support plates to include a lock pin that is able to lock the inner support plate to the outer support plate.

These together with additional objects, features and advantages of the swiveling tailgate support system will be readily apparent to those of ordinary skill in the art upon reading the following detailed description of presently preferred, but nonetheless illustrative, embodiments of the swiveling tailgate support system when taken in conjunction with the accompanying drawings.

In this respect, before explaining the current embodiments of the swiveling tailgate support system in detail, it is to be understood that the swiveling tailgate support system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the swiveling tailgate support system.

It is therefore important that the claims be regarded as including such equivalent construction insofar as they do not depart from the spirit and scope of the swiveling tailgate support system. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

As best illustrated in FIGS. 1 through 10, the swiveling tailgate support system 100 (hereinafter invention) is further comprised of an outer support assembly 101 that includes two outer mounting brackets 102 from which an outer bar member 103 attaches. An outer support plate 104 is pivotably attached to the outer bar member 103 such that the outer support plate 104 is able to rotate from a prone or parallel orientation with an inner surface 201 of a tailgate 200 to an erected position, which is perpendicular with the inner surface 201 of the tailgate 200 of a vehicle 202. The outer mounting brackets 102 are rigidly affixed to the inner surface 201 of the tailgate 200 via fastening members 105 that comprise bolts, screws, rivets, etc. the outer support plate 104 is biased towards the prone position via a spring member 106 that connects between the outer support plate 104 and one of the outer mounting brackets 102. The spring member 106 ensures a prone orientation of the outer support plate 104 when not in use with an inner support assembly 110.

The outer support plate 104 includes outer support plate armatures 107 that include armatures holes 108 for pivotable connection with the outer bar member 103. The outer support plate 104 includes a pin lock 109 that is located at a distal end 111 of the outer support plate 104 relative of the outer support plate armatures 107. The distal end 111 of the outer support plate 104 has a generally circular shape, which will be explained further below.

The inner support assembly 110 is further defined with inner support plates 112 located at distal ends of the inner support assembly 110. Moreover, the inner support assembly 110 includes inner support members 113 that span in between the inner support plates 112. The inner support members 113 are each further defined with adjustable mounting blocks 113A that are configured to secure an object 300 atop of the inner support members 113. Moreover, the adjustable mounting blocks 113A are slideably engaged along the inner support members 113 so that the inner support assembly 110 is able to adapt to different shapes and sizes and types of objects 300.

The inner support plates 112 each include a pivot bracket 114 that is oriented outwardly with respect to a centerline 500 of the vehicle 202. The pivot bracket 114 is a circularly-shaped object with a receiving shoulder 115 that enables the pivot bracket 114 to be seated atop of the distal end 111 of the outer support plate 104.

The pin lock 109 is a unique component of the invention 100 in that it includes a pin lock plate 116 that rests against an inner surface 117 of the outer support plate 104. The pin lock plate 116 includes a pin lock armature 118 that extends inwardly towards the centerline 500 where a pin lock shoulder 119 is provided. The receiving shoulder 115 of the pivot bracket 114 is uniquely shaped and designed to fit onto the pin lock shoulder 199 such that the inner support assembly 110 is able to pivot with respect to the outer support assembly 101. The pin lock 109 includes a key 120 that is able to secure the inner support plate 112 with respect to the outer support plate 104.

The inner support assembly 110 includes inner support brackets 122 that connect the inner support plates 112 to the inner support members 113. Moreover, the inner support brackets 122 include an inner bar member 123 that spans in between two adjacent inner support brackets 122. The inner support plates 112 include inner armatures 124 with inner armature holes 125 that enable the inner support plates 112 to rotate with respect to the inner bar member 123. Collar members 126 are included and span in between the inner support brackets 122 and the inner armatures 124. Moreover, the collar members 126 ensure that the inner support plates 112 do not slide back and forth between the inner support members 113. The collar members 126 are concentrically fitted over the inner bar member 123. The inner armatures 124 enable the inner support plates 112 to fold to a prone position with respect to the inner support members 113 such that the inner support assembly 110 is able to collapse when not in use.

The inner support plates 112 each include handles 127 that are oriented inwardly towards the centerline 500 such that the inner support assembly 110 is able to be lifted and removed from the outer support assembly 101. Moreover, the handles 127 are located on an inner surface 128 of the inner support plates 112.

The key 120 may include a key lock pin 133 that is a cylindrically-shaped object designed to be inserted into a key lock pin hole 134 provided on the inner support plates 112, and upon doing so shall lock the inner support plate 112 with respect to the outer support plate 104.

Figure 1:
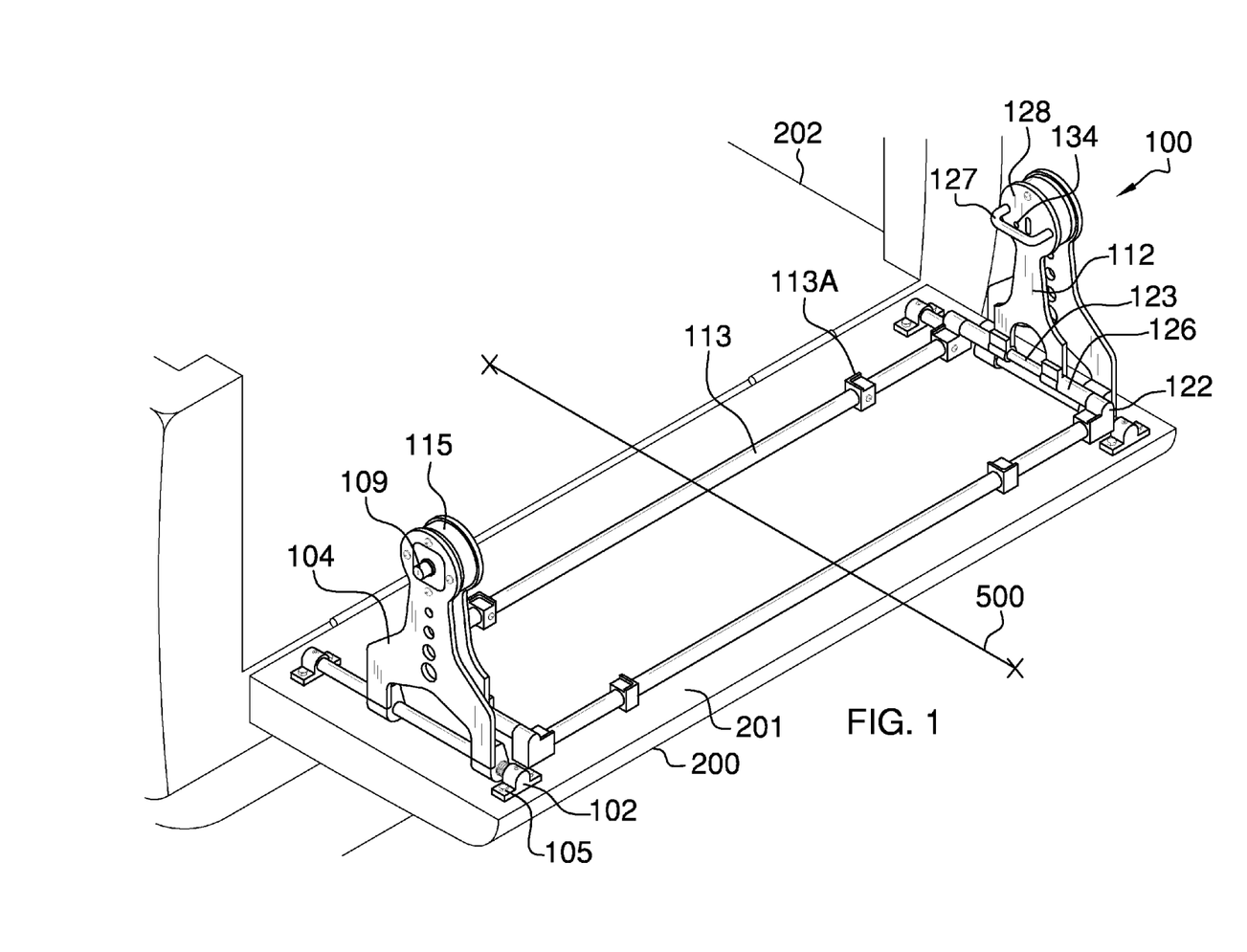
FIG. 1 is a top, perspective view of the swiveling tailgate support system installed on an inner surface of a tailgate.
Figure 2:
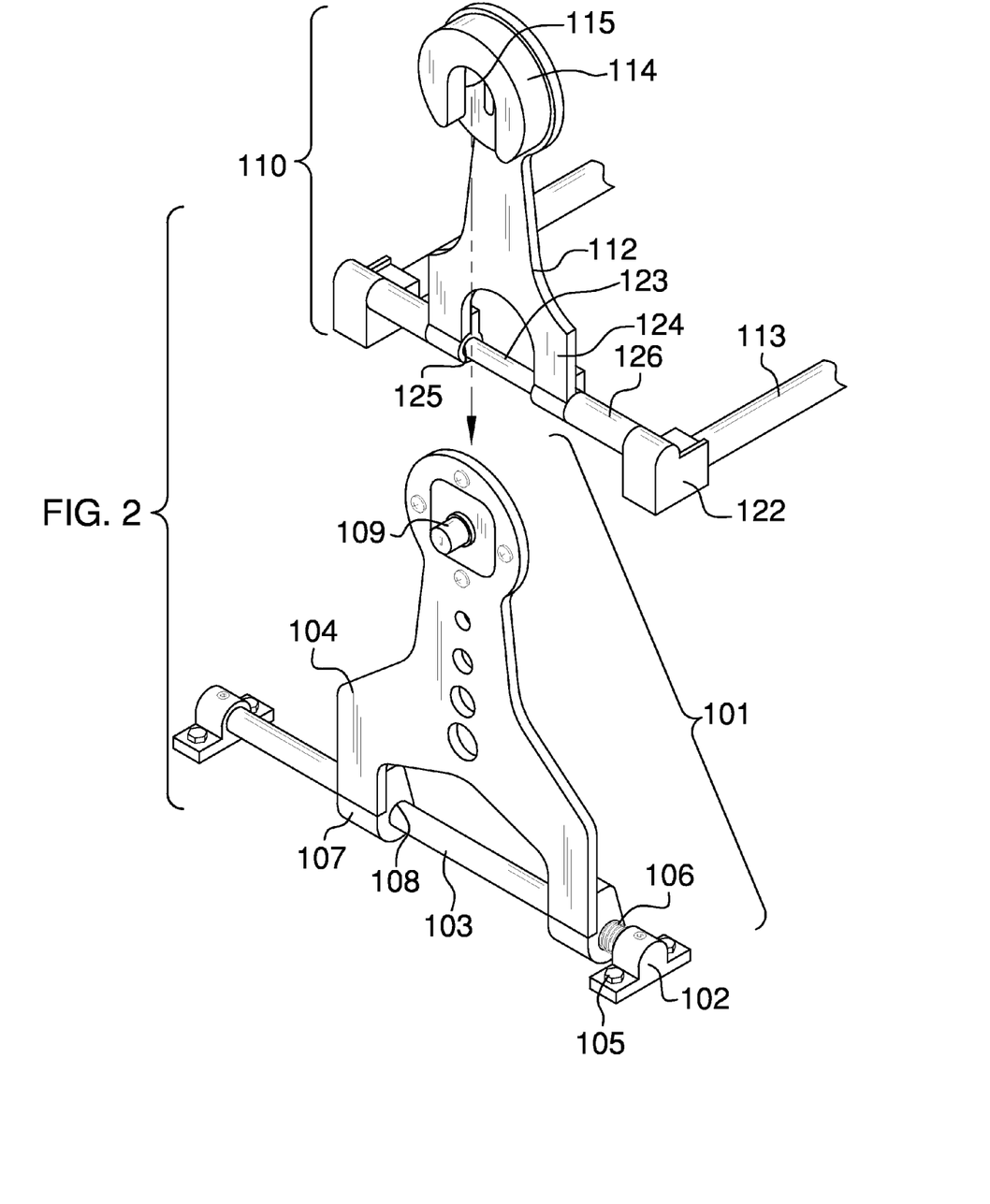
FIG. 2 is an exploded view of the inner support assembly aligned above the outer support assembly.
Figure 2A:
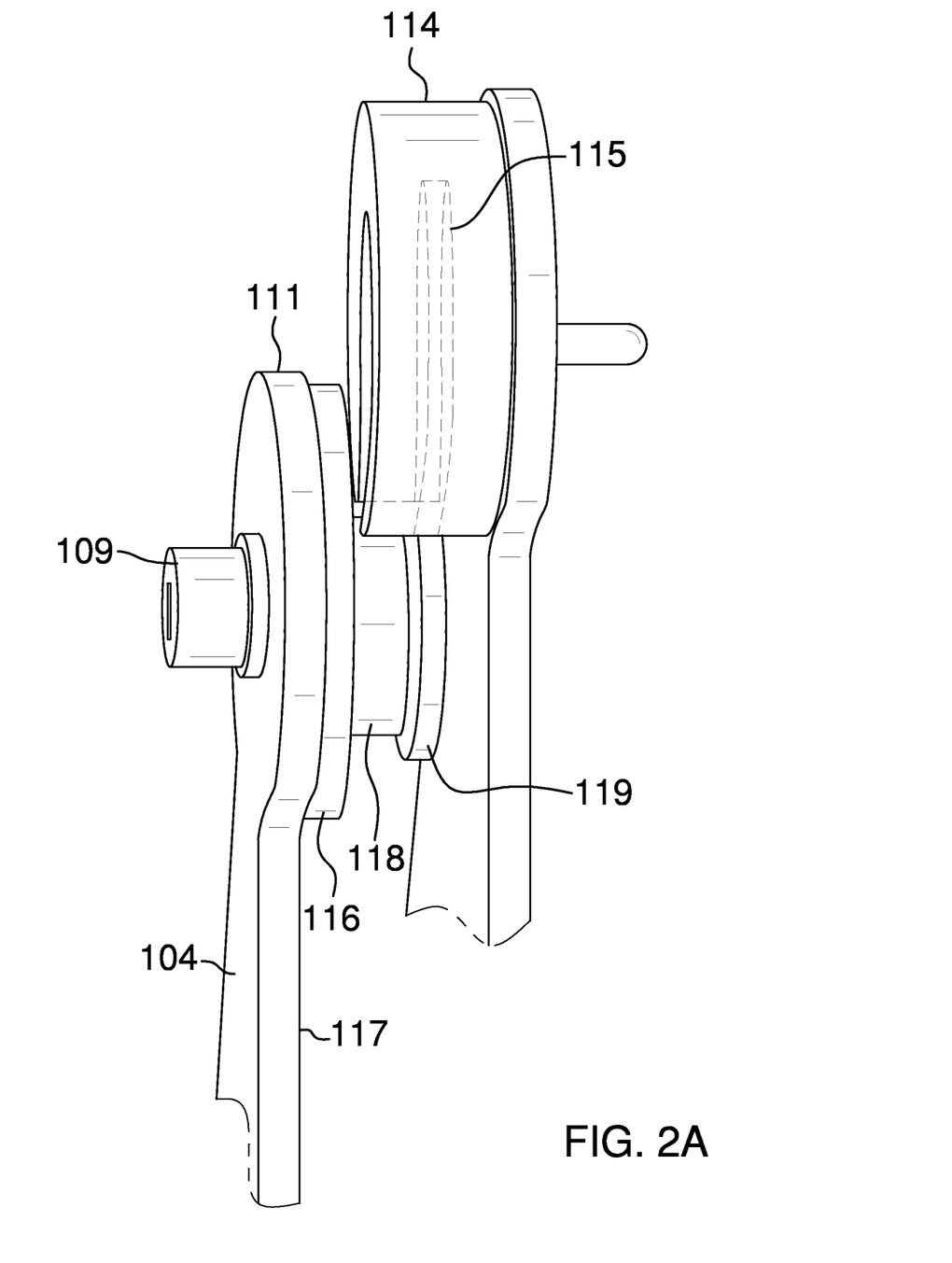
FIG. 2A is a detail view of the pivot bracket adjacent the lock pin and outer support plate.
Figure 3:
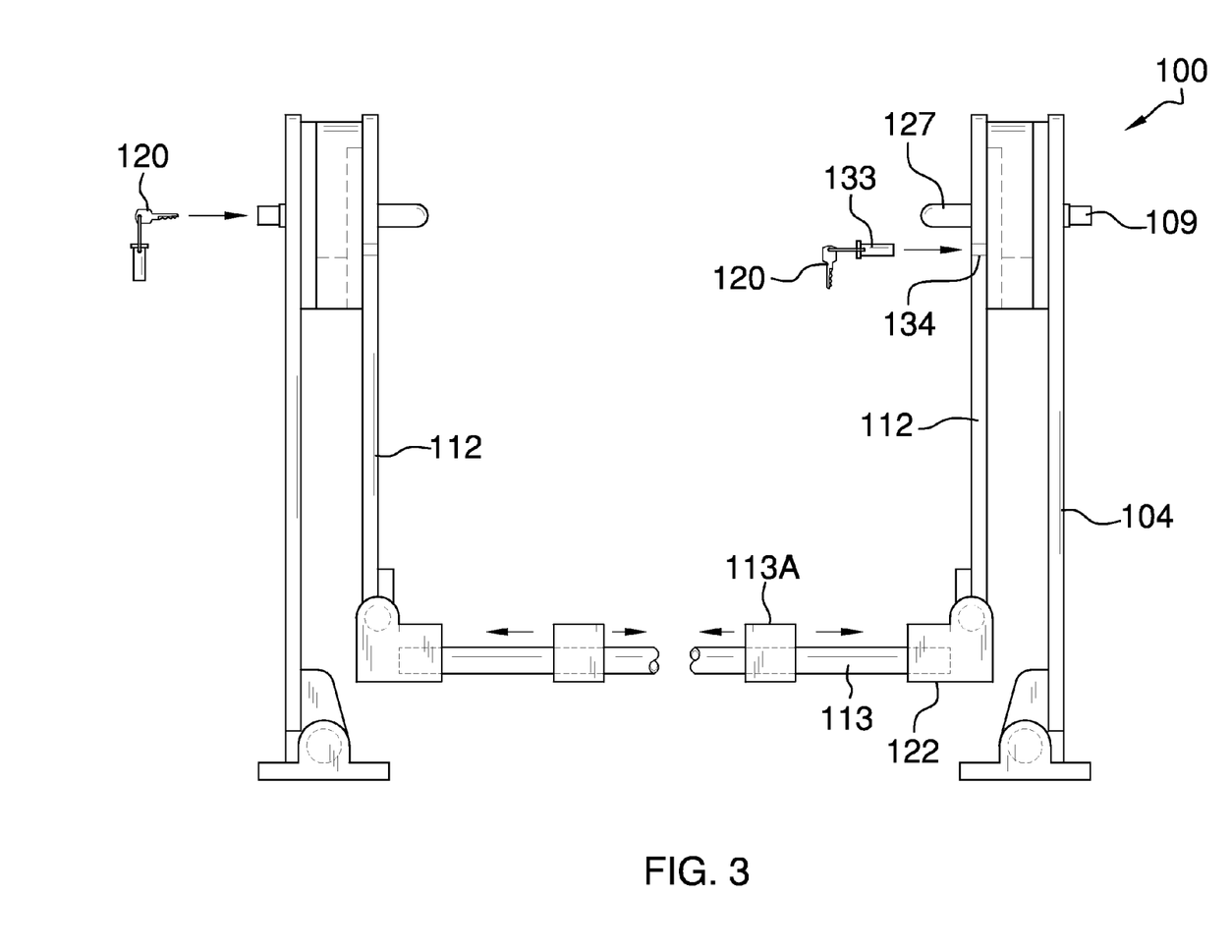
FIG. 3 is a side view of the swiveling tailgate support system.
Figure 4:
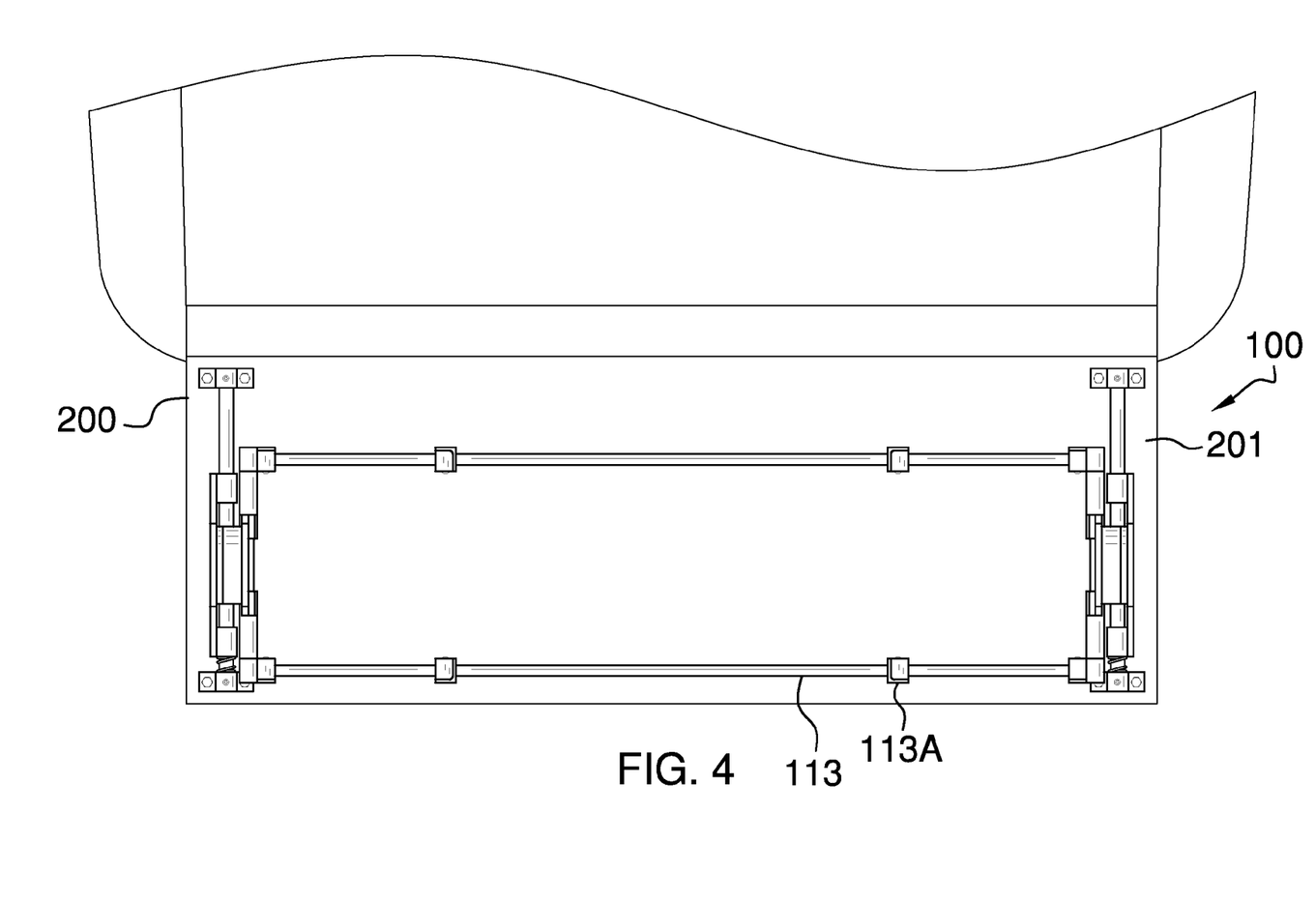
FIG. 4 is a top view of the swiveling tailgate support system, and with the tailgate lowered.
Figure 5A:
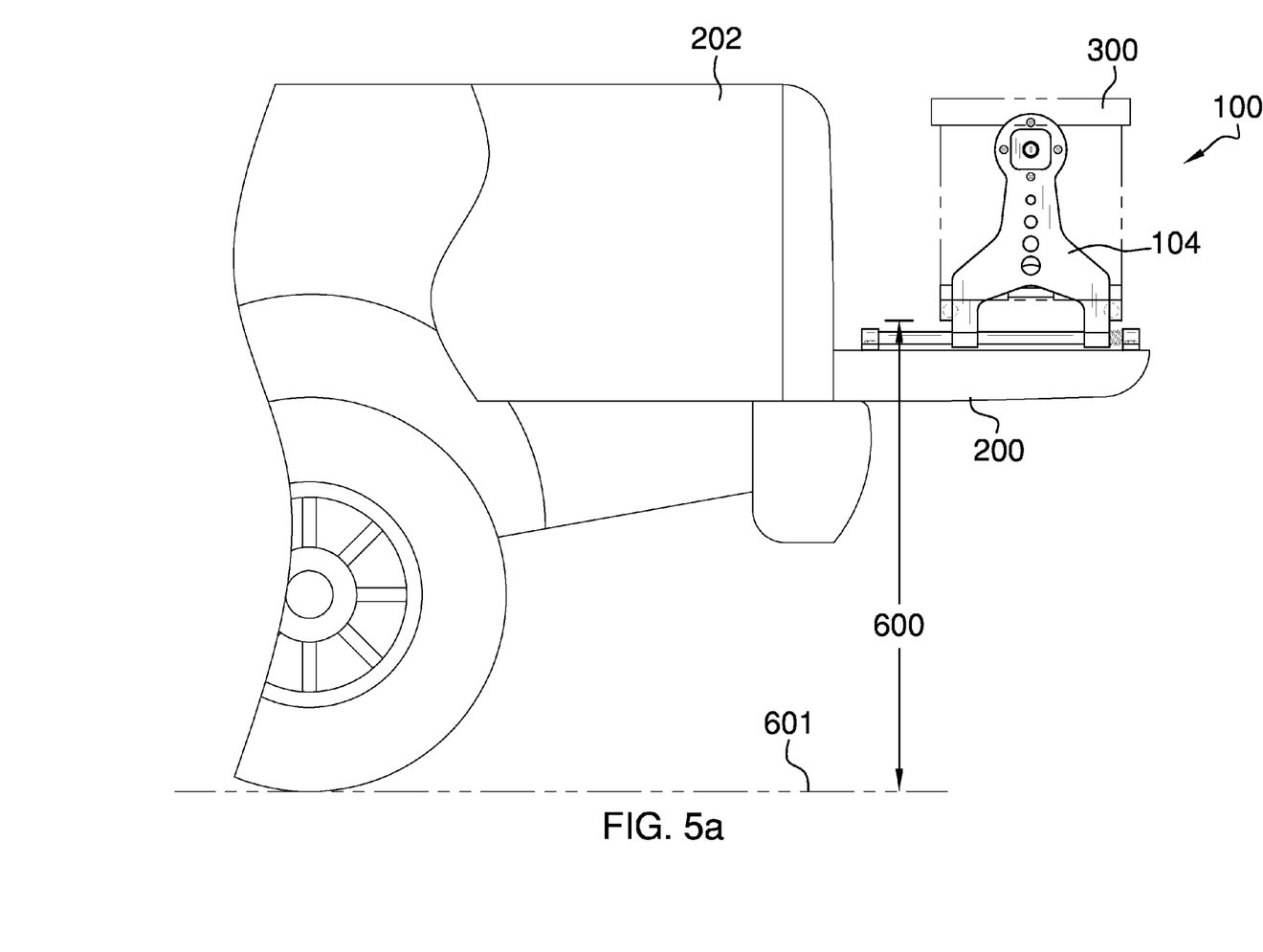
FIG. 5A is a side view of the swiveling tailgate support system with the tailgate lowered.
Figure 5B:
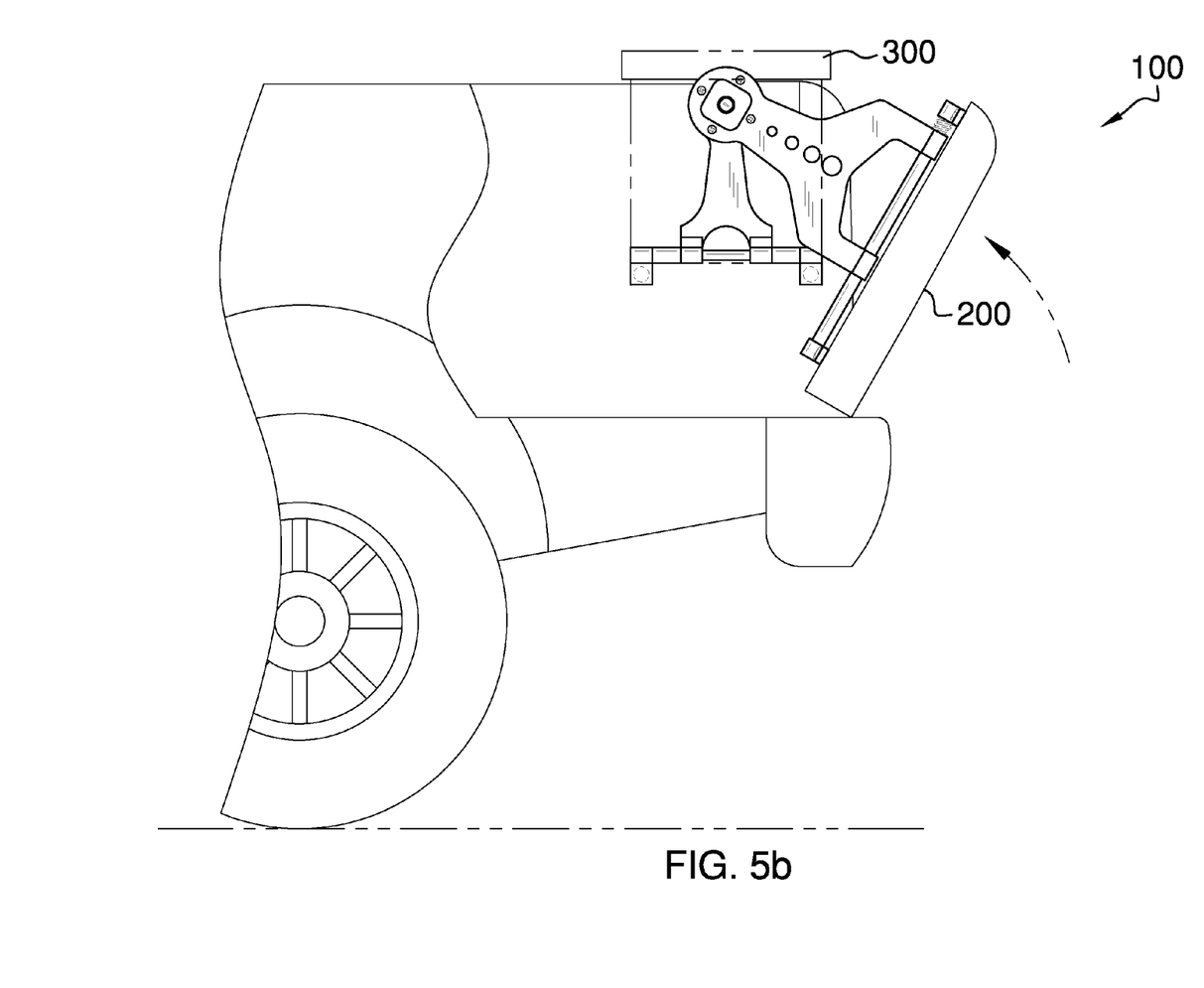
FIG. 5B is a side view depicting pivoting movement of the inner support assembly with respect to the tailgate and the outer support assembly.
Figure 5C:
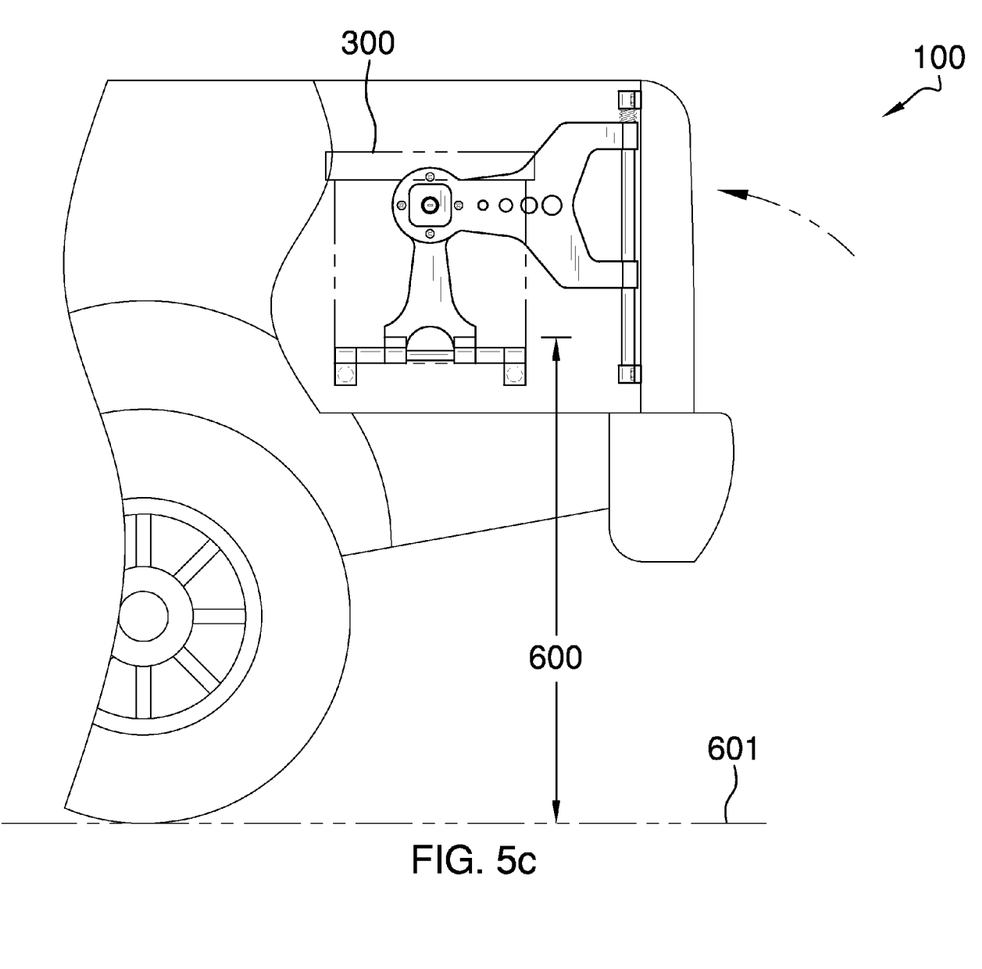
FIG. 5C is a side view of the swiveling tailgate support system with the tailgate in the raised position.
Figure 6:
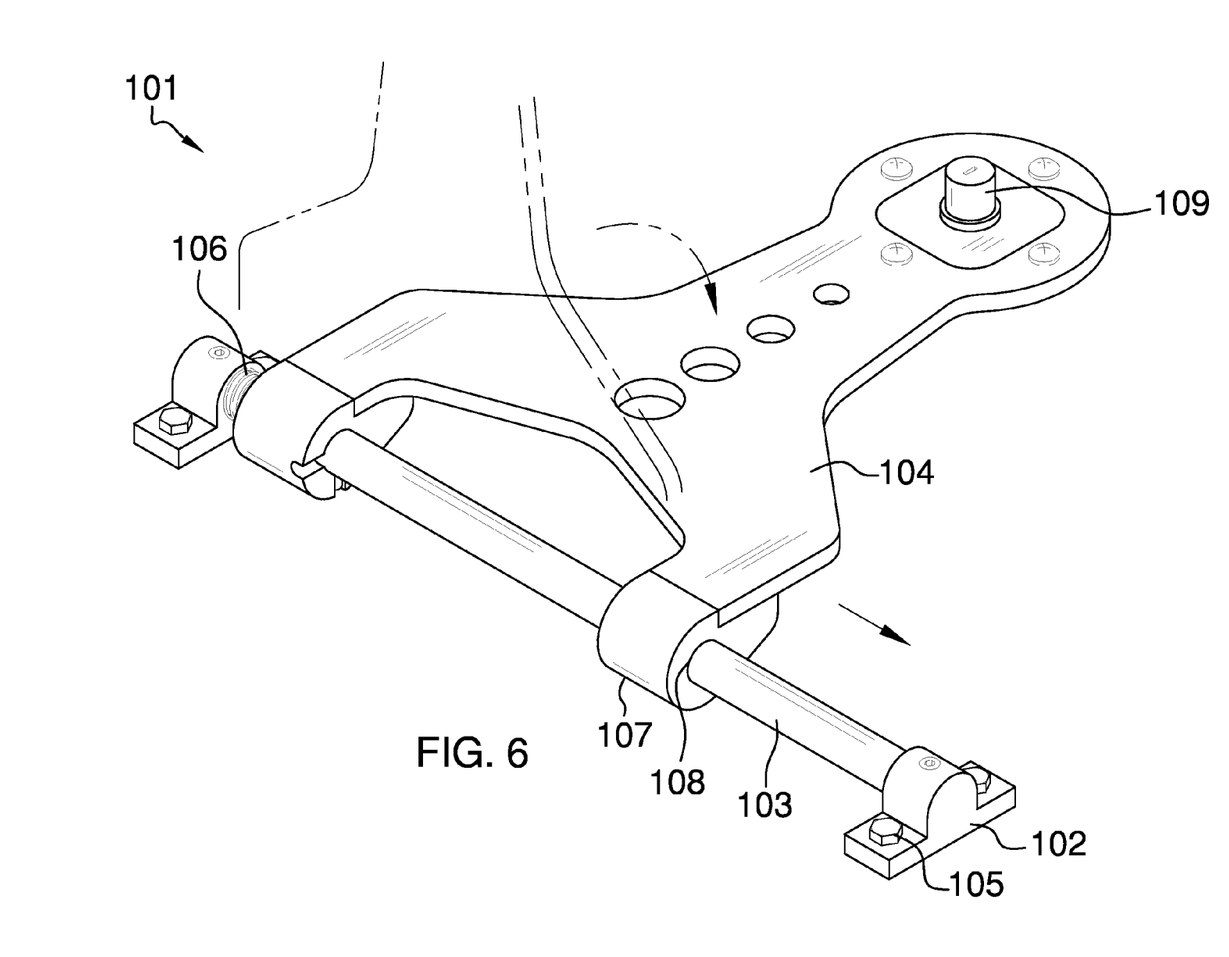
FIG. 6 is a perspective view depicting the outer support plate folding from an erect position to a prone position.
Figure 7:
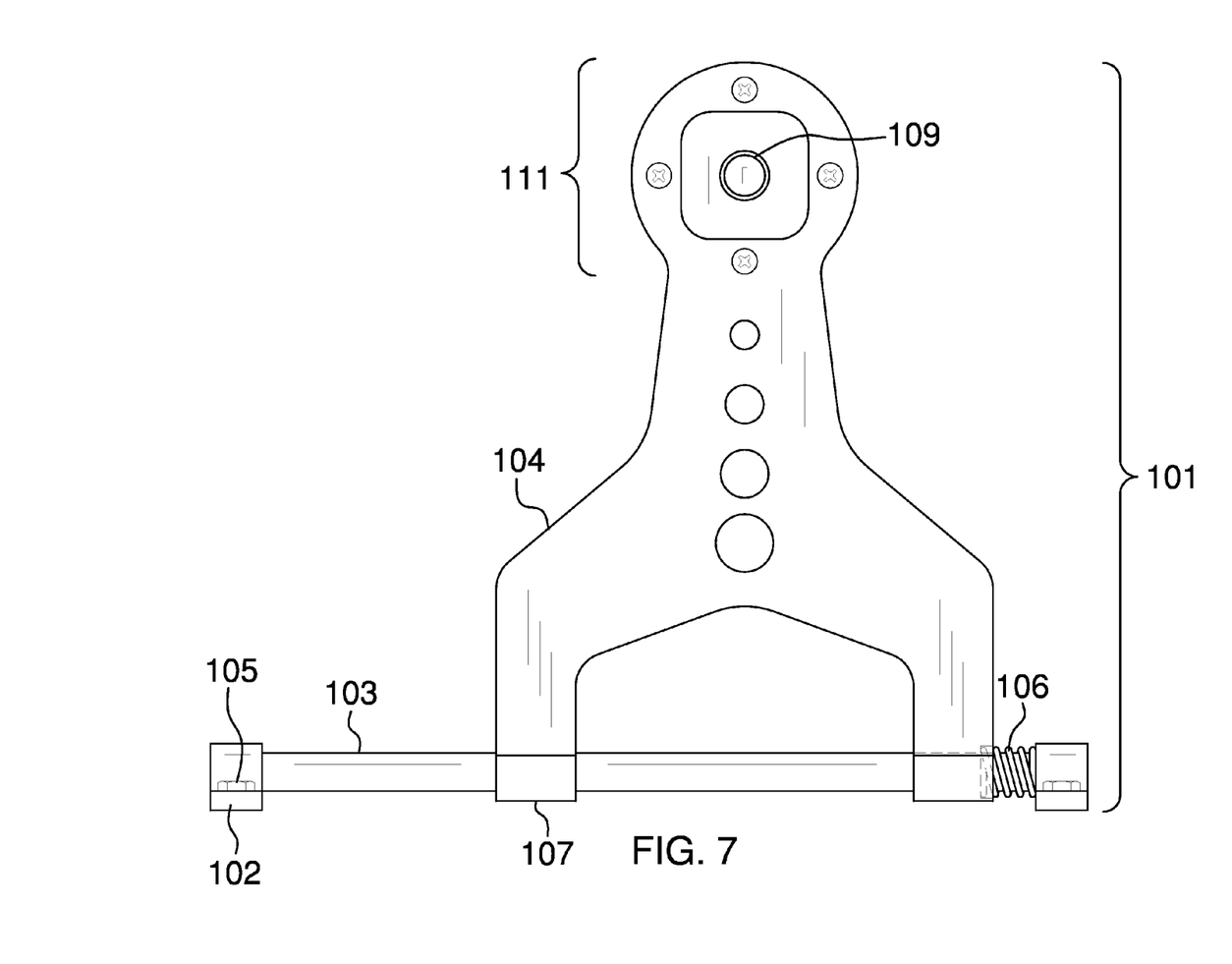
FIG. 7 is a front view of the outer support plate.
Figure 8:
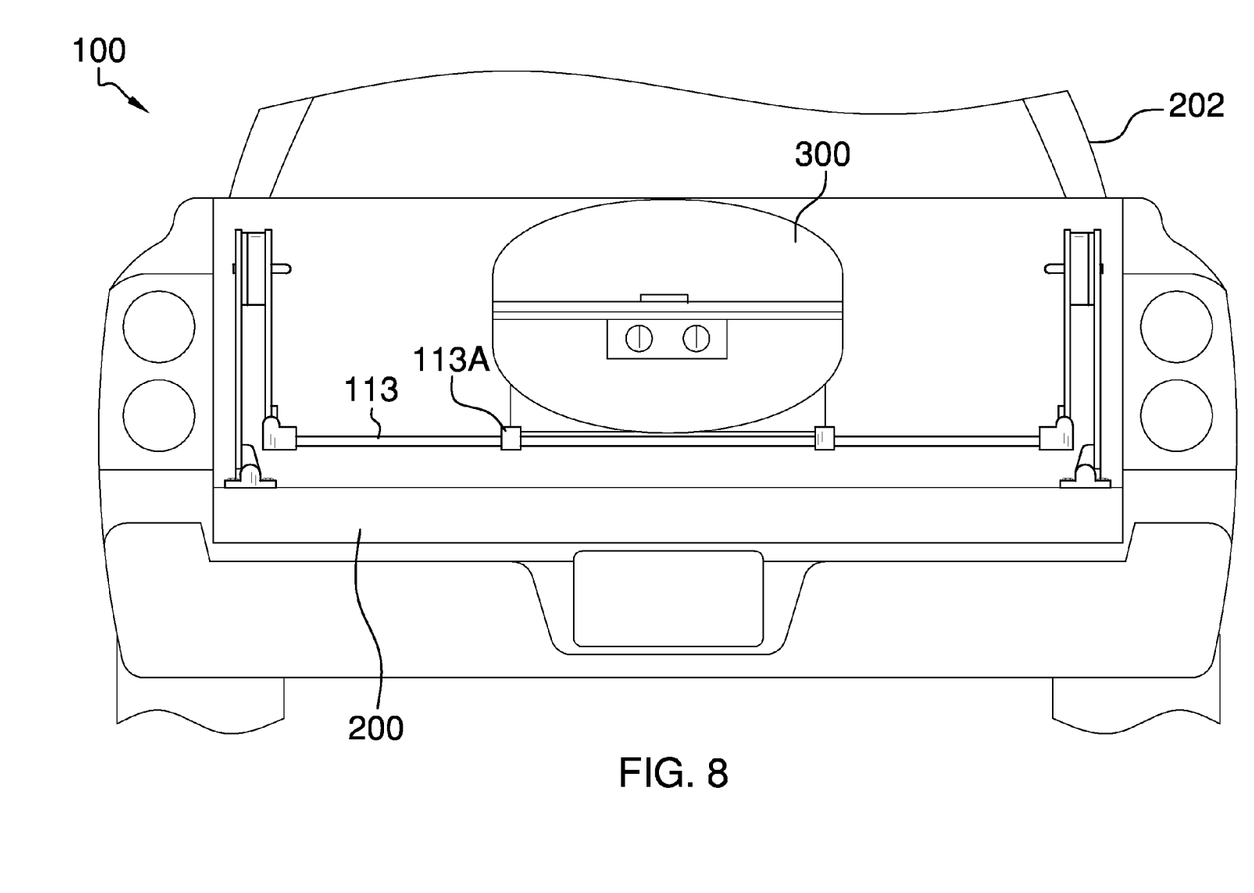
FIG. 8 is a rear view of the swiveling tailgate support system, and depicting a grill secured thereon.
Figure 9:
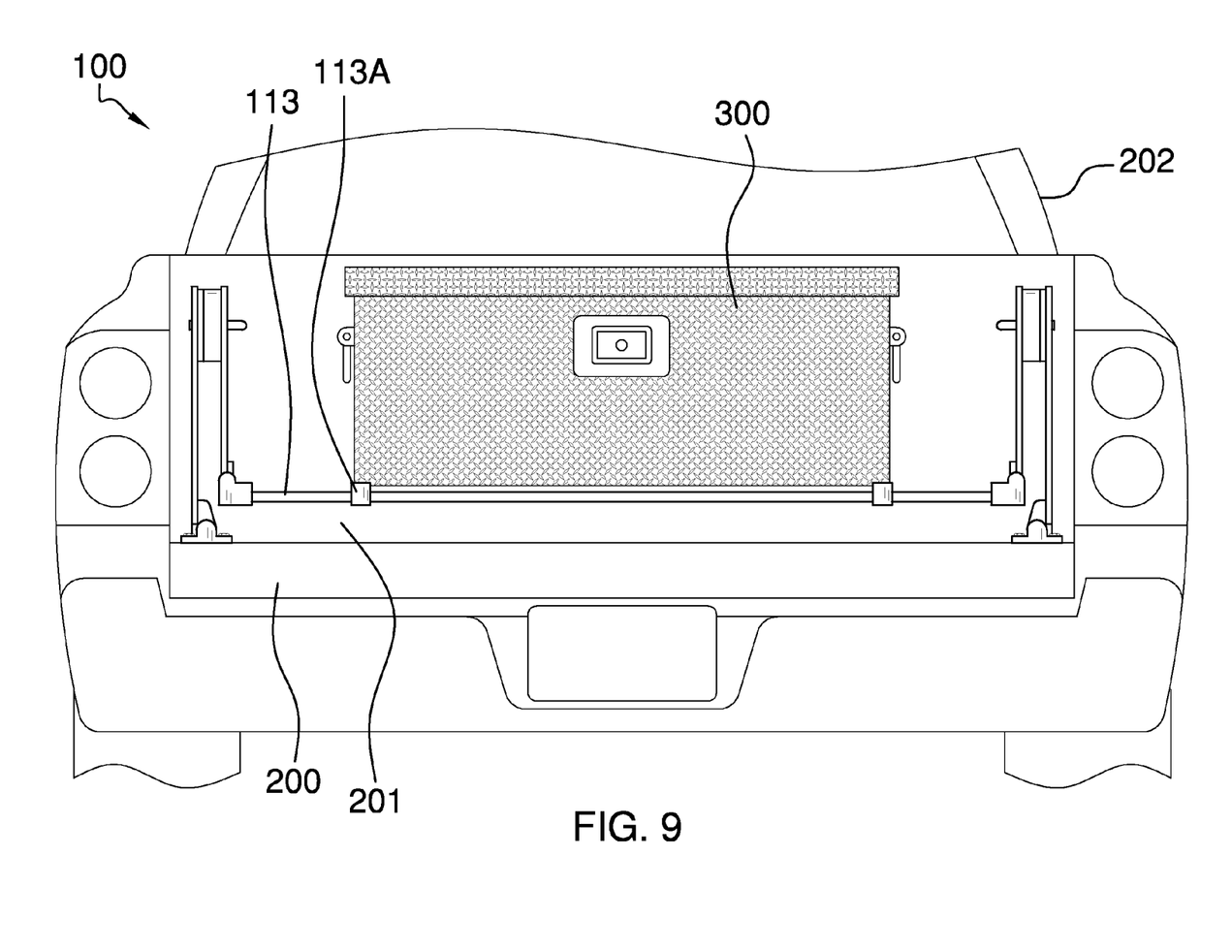
FIG. 9 is a rear view of the swiveling tailgate support system, and depicting a toolbox secured thereon.

Referring to FIGS. 5A-C, the invention 100 is able to support the object 300 in relative proximity of the inner surface 201 of the tailgate 200. Moreover, the inner support assembly 110 is able to pivot with respect to the outer support assembly 101 and the inner surface 201. The inner support assembly 110 pivots as the tailgate 200 is raised or lowered while maintaining the object 300 at a level orientation at all times. It shall be noted that in FIG. 5C, the tailgate is an in raised position, and that the object 300 is at an elevation 600 above a ground surface 601, which is consistent in FIG. 5A where the tailgate 200 is in a lowered position.

Figure 10:
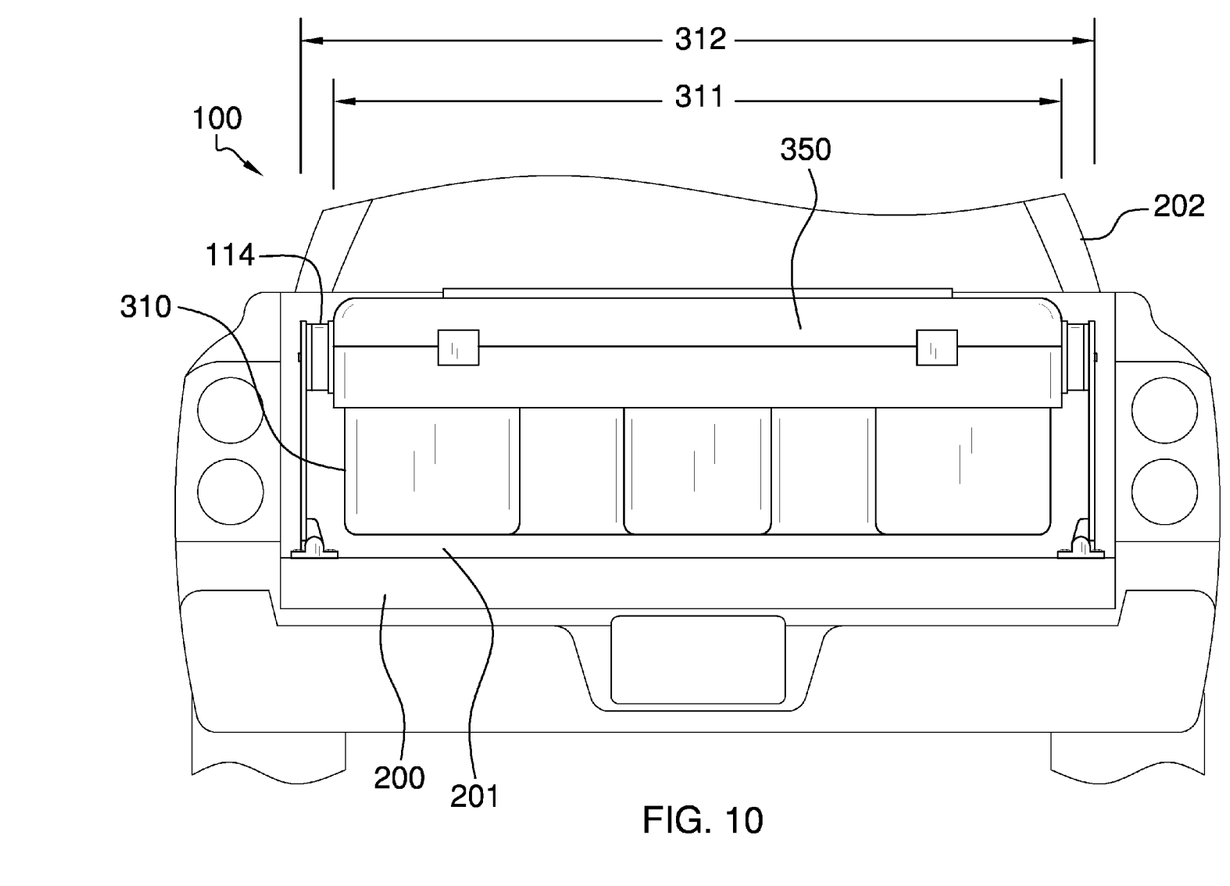
FIG. 10 is a rear view of the swiveling tailgate support system wherein a toolbox having the inner support assembly integrated thereon and for use with the outer support assembly.

Referring to FIG. 10, the invention 100 is adapted for use with a second object 350, and is able to allow the second object 350 to be secured to the outer support assembly 101 directly. Moreover, the second object 350 is different in shape and size when compared with the other objects 300 depicted in FIGS. 1-9. The second object 350 has pivot brackets 114 on side surfaces 310. The pivot brackets 114 are positioned to enable the second object 350 to connect with the outer support assembly 101 directly, and with no need for the inner support assembly 110. However, it shall be noted that the second object 350 has a second object length 311 that corresponds to an outer support assembly span 312 formed between the outer support assembly 101.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A swiveling tailgate support system comprising:
   an inner support assembly that attaches to an outer support assembly;
   wherein the inner support assembly is configured to secure an object thereon;

wherein the outer support assembly is configured to be secured to an inner surface of a tailgate of a vehicle;

wherein the inner support assembly pivots as the tailgate is raised and lowered while maintaining the object secured thereon at a level orientation;

wherein the outer support assembly includes two outer mounting brackets on opposing sides of the inner surface of the tailgate; wherein the outer mounting brackets support an outer bar member there between;

wherein an outer support plate is pivotably attached to the two outer bar member such that the outer support plate is able to rotate from a prone or parallel orientation with the inner surface of the tailgate to an erected position, which is perpendicular with the inner surface of the tailgate;

wherein the outer support plate is biased towards the prone position via a spring member that connects between the outer support plate and one of the outer mounting brackets; wherein the spring member ensures a prone orientation of the outer support plate when not in use with the inner support assembly.

2. The swiveling tailgate support system according to claim 1 wherein the outer mounting brackets are rigidly affixed to the inner surface of the tailgate via fastening members that comprise bolts, screws, and rivets.

3. The swiveling tailgate support system according to claim 1 wherein the outer support plate includes outer support plate armatures that include armatures holes for pivotable connection with the outer bar member; wherein the outer support plate includes a pin lock that is located at a distal end of the outer support plate relative of the outer support plate armatures; wherein the distal end of the outer support plate has a generally circular shape.

4. The swiveling tailgate support system according to claim 3 wherein the inner support assembly is further defined with inner support plates located at distal ends of the inner support assembly; wherein the inner support assembly includes inner support members that span in between the inner support plates; wherein the inner support members are each further defined with adjustable mounting blocks that are configured to secure the object atop of the inner support members.

5. The swiveling tailgate support system according to claim 4 wherein the inner support plates each include a pivot bracket that is oriented outwardly with respect to a centerline of the vehicle; wherein the pivot bracket is a circularly-shaped object with a receiving shoulder that enables the pivot bracket to be seated atop of the distal end of the outer support plate; wherein the pin lock includes a pin lock plate that rests against an inner surface of the outer support plate; wherein the pin lock plate includes a pin lock armature that extends inwardly towards the centerline where a pin lock shoulder is provided; wherein the receiving shoulder of the pivot bracket fits onto the pin lock shoulder such that the inner support assembly is able to pivot with respect to the outer support assembly.

6. The swiveling tailgate support system according to claim 5 wherein the pin lock includes a key that is able to secure the inner support plate with respect to the outer support plate.

7. The swiveling tailgate support system according to claim 6 wherein the inner support assembly includes inner support brackets that connect the inner support plates to the inner support members; wherein the inner support brackets include an inner bar member that spans in between two adjacent inner support brackets; wherein the inner support plates include inner armatures with inner armature holes that enable the inner support plates to rotate with respect to the inner bar member; wherein collar members are included and span in between the inner support brackets and the inner armatures; wherein the collar members are concentrically fitted over the inner bar member.

8. The swiveling tailgate support system according to claim 7 wherein the inner armatures enable the inner support plates to fold to a prone position with respect to the inner support members such that the inner support assembly is able to collapse when not in use; wherein the inner support plates each include handles that are oriented inwardly towards the centerline such that the inner support assembly is able to be lifted and removed from the outer support assembly; wherein the handles are located on an inner surface of the inner support plates.

9. The swiveling tailgate support system according to claim 8 wherein a key lock pin is a cylindrically-shaped object that is inserted into a key lock pin hole provided on the inner support plates, and locks the inner support plate with respect to the outer support plate.

10. A swiveling tailgate support system comprising:

an inner support assembly that attaches to an outer support assembly;

wherein the inner support assembly is configured to secure an object thereon;

wherein the outer support assembly is configured to be secured to an inner surface of a tailgate of a vehicle;

wherein the inner support assembly pivots as the tailgate is raised and lowered while maintaining the object secured thereon at a level orientation;

wherein the outer support assembly includes two outer mounting brackets on opposing sides of the inner surface of the tailgate; wherein the outer mounting brackets support an outer bar member there between;

wherein an outer support plate is pivotably attached to the two outer bar member such that the outer support plate is able to rotate from a prone or parallel orientation with the inner surface of the tailgate to an erected position, which is perpendicular with the inner surface of the tailgate;

wherein the outer support plate is biased towards the prone position via a spring member that connects between the outer support plate and one of the outer mounting brackets; wherein the spring member ensures a prone orientation of the outer support plate when not in use with the inner support assembly;

wherein the outer support plate includes outer support plate armatures that include armatures holes for pivotable connection with the outer bar member; wherein the outer support plate includes a pin lock that is located at a distal end of the outer support plate relative of the outer support plate armatures; wherein the distal end of the outer support plate has a generally circular shape;

wherein the inner support assembly is further defined with inner support plates located at distal ends of the inner support assembly; wherein the inner support assembly includes inner support members that span in between the inner support plates; wherein the inner support members are each further defined with adjustable mounting blocks that are configured to secure the object atop of the inner support members;

wherein the outer mounting brackets are rigidly affixed to the inner surface of the tailgate via fastening members that comprise bolts, screws, and rivets.

11. The swiveling tailgate support system according to claim 10 wherein the inner support plates each include a pivot bracket that is oriented outwardly with respect to a centerline of the vehicle; wherein the pivot bracket is a circularly-shaped object with a receiving shoulder that enables the pivot bracket to be seated atop of the distal end of the outer support plate; wherein the pin lock includes a pin lock plate that rests against an inner surface of the outer support plate; wherein the pin lock plate includes a pin lock armature that extends inwardly towards the centerline where a pin lock shoulder is provided; wherein the receiving shoulder of the pivot bracket fits onto the pin lock shoulder such that the inner support assembly is able to pivot with respect to the outer support assembly; wherein the pin lock includes a key that is able to secure the inner support plate with respect to the outer support plate.

12. The swiveling tailgate support system according to claim 11 wherein the inner support assembly includes inner support brackets that connect the inner support plates to the inner support members; wherein the inner support brackets include an inner bar member that spans in between two adjacent inner support brackets; wherein the inner support plates include inner armatures with inner armature holes that enable the inner support plates to rotate with respect to the inner bar member; wherein collar members are included and span in between the inner support brackets and the inner armatures; wherein the collar members are concentrically fitted over the inner bar member.

13. The swiveling tailgate support system according to claim 12 wherein the inner armatures enable the inner support plates to fold to a prone position with respect to the inner support members such that the inner support assembly is able to collapse when not in use; wherein the inner support plates each include handles that are oriented inwardly towards the centerline such that the inner support assembly is able to be lifted and removed from the outer support assembly; wherein the handles are located on an inner surface of the inner support plates; wherein a key lock pin is a cylindrically-shaped object that is inserted into a key lock pin hole provided on the inner support plates, and locks the inner support plate with respect to the outer support plate.

14. A swiveling tailgate support system comprising:
an outer support assembly;
wherein a second object includes pivot brackets on side surfaces;
wherein the second object is configured to secure to the outer support assembly directly;
wherein the outer support assembly is configured to be secured to an inner surface of a tailgate of a vehicle;
wherein the second object pivots as the tailgate is raised and lowered while maintaining the second object secured thereon at a level orientation;
wherein the outer support assembly includes two outer mounting brackets on opposing sides of the inner surface of the tailgate; wherein the outer mounting brackets support an outer bar member there between;
wherein an outer support plate is pivotably attached to the two outer bar member such that the outer support plate is able to rotate from a prone or parallel orientation with the inner surface of the tailgate to an erected position, which is perpendicular with the inner surface of the tailgate;
wherein the outer support plate is biased towards the prone position via a spring member that connects between the outer support plate and one of the outer mounting brackets; wherein the spring member ensures a prone orientation of the outer support plate when not in use with the inner support assembly;
wherein the outer support plate includes outer support plate armatures that include armatures holes for pivotable connection with the outer bar member; wherein the outer support plate includes a pin lock that is located at a distal end of the outer support plate relative of the outer support plate armatures; wherein the distal end of the outer support plate has a generally circular shape;
wherein the outer mounting brackets are rigidly affixed to the inner surface of the tailgate via fastening members that comprise bolts, screws, and rivets.

15. The swiveling tailgate support system according to claim 14 wherein the pivot brackets are oriented outwardly with respect to a centerline of the vehicle; wherein the pivot brackets are each a circularly-shaped object with a receiving shoulder that enables the pivot brackets to be seated atop of the distal end of the outer support plate; wherein the pin lock includes a pin lock plate that rests against an inner surface of the outer support plate; wherein the pin lock plate includes a pin lock armature that extends inwardly towards the centerline where a pin lock shoulder is provided; wherein the receiving shoulder of the pivot bracket fits onto the pin lock shoulder such that the second object is able to pivot with respect to the outer support assembly; wherein the pin lock includes a key that is able to secure the inner support plate with respect to the outer support plate.

* * * * *